Feb. 25, 1969 — P. E. SUIT — 3,429,288
SHIP ASSEMBLY METHOD AND APPARATUS THEREFOR
Filed May 31, 1967 — Sheet 1 of 5
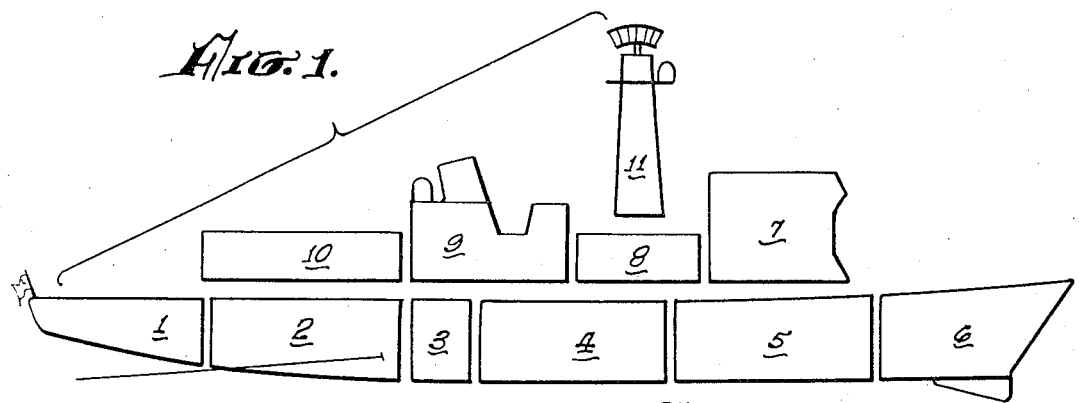
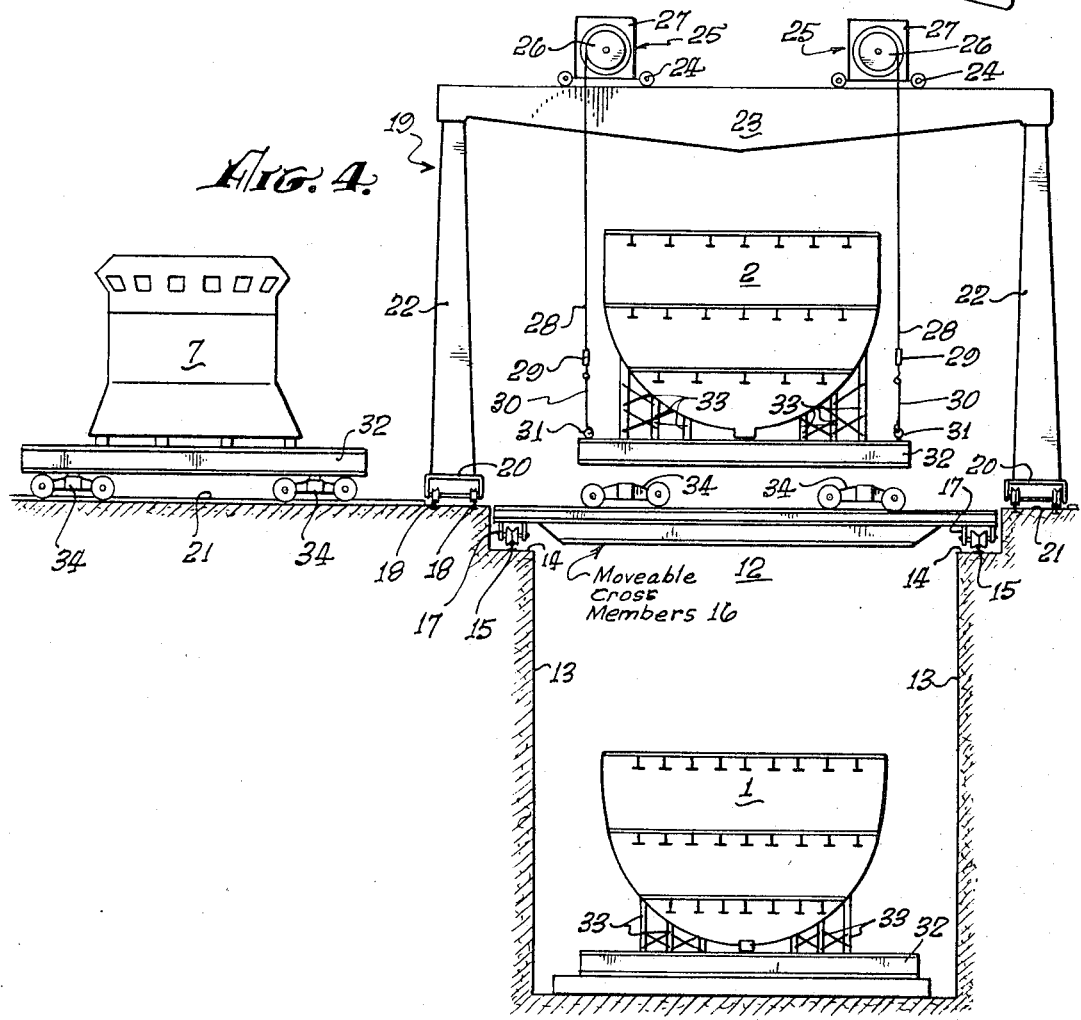
INVENTOR
PAUL E. SUIT,
By L. E. Carnahan
AGENT

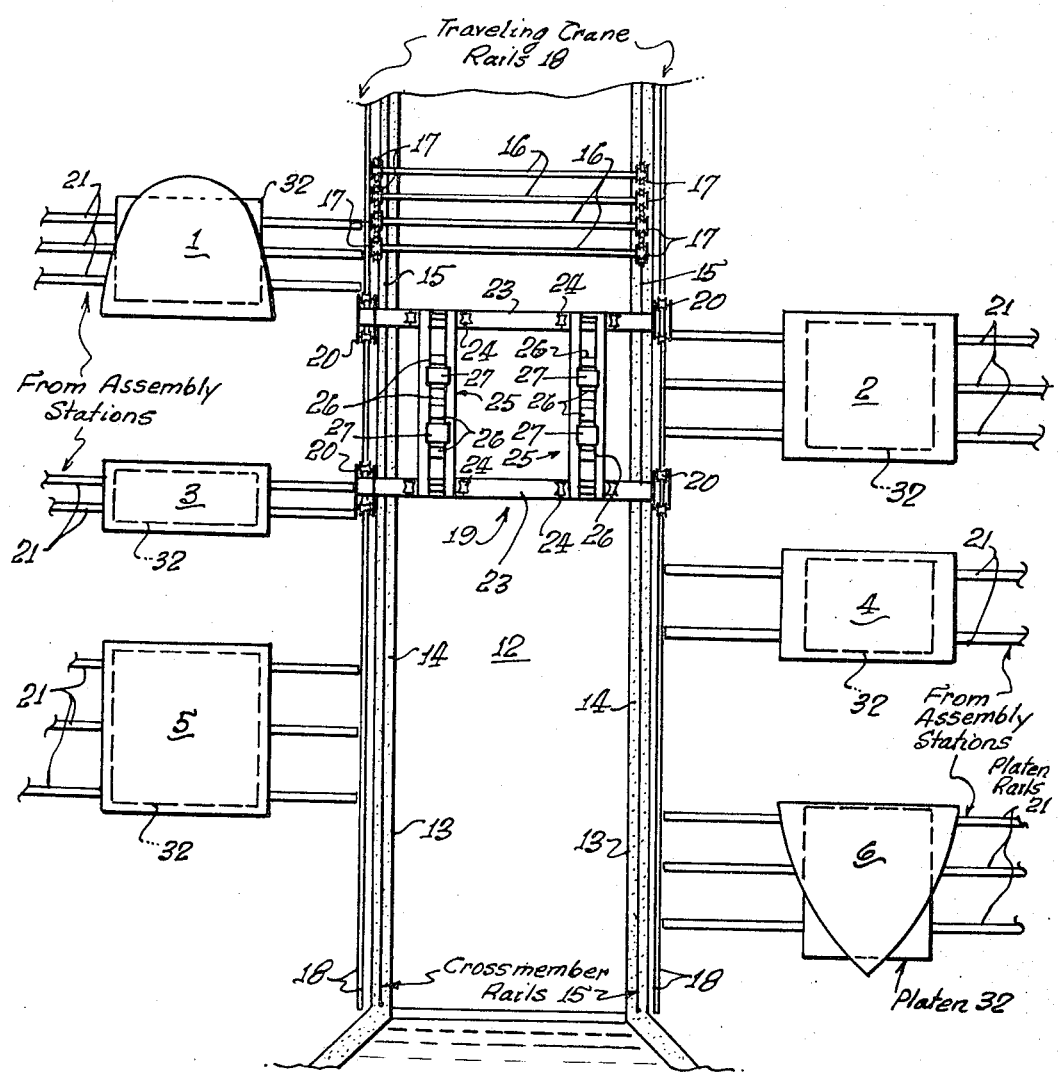

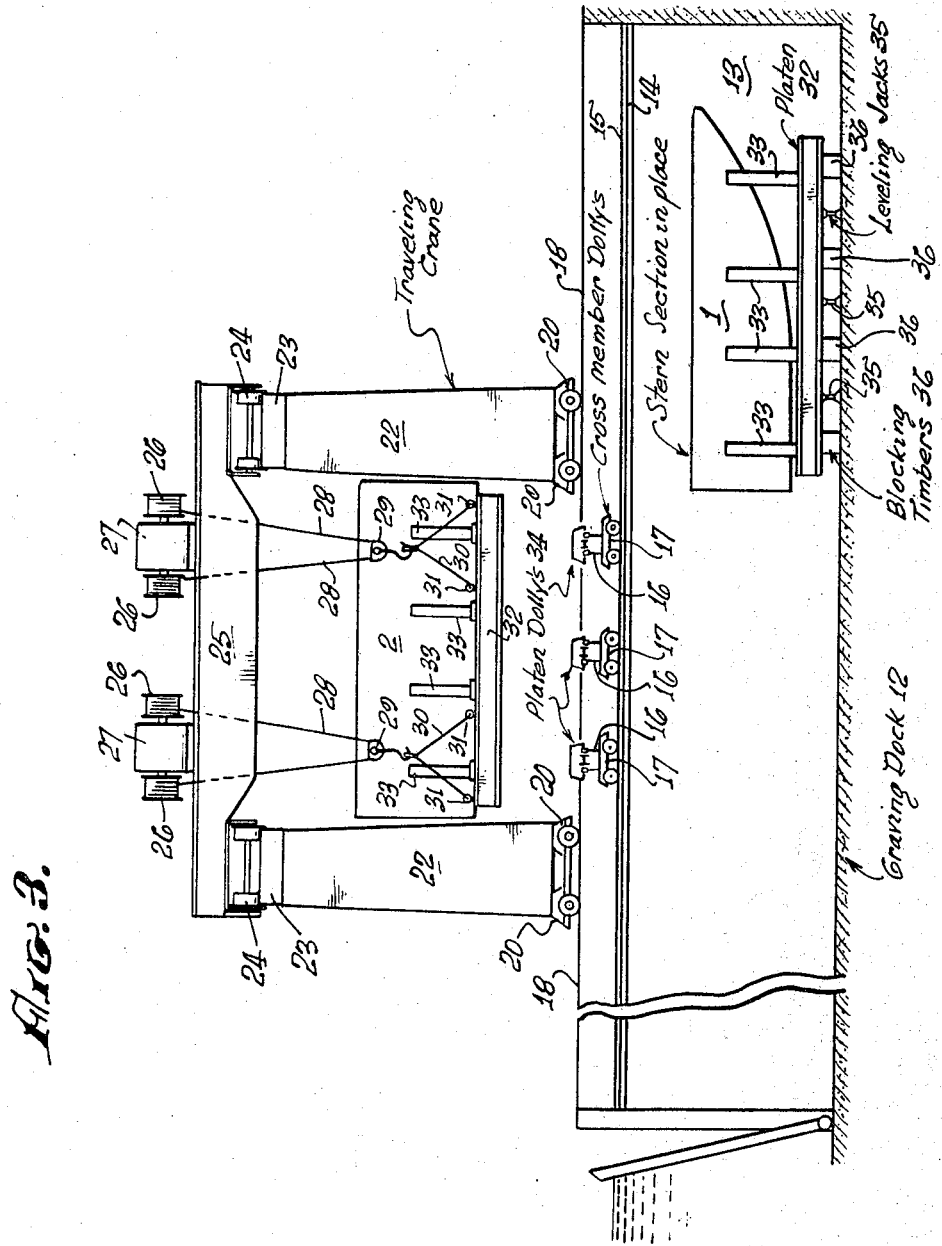

United States Patent Office 3,429,288
Patented Feb. 25, 1969

3,429,288
SHIP ASSEMBLY METHOD AND
APPARATUS THEREFOR
Paul E. Suit, Ontario, Calif., assignor to General
Dynamics Corporation, a corporation of Delaware
Filed May 31, 1967, Ser. No. 642,521
U.S. Cl. 114—77        6 Claims
Int. Cl. B63b 3/02

ABSTRACT OF THE DISCLOSURE

Broadly, the disclosure is directed to a method for assembling ships wherein ship sections fabricated on movable platens at working stations adjacent to a graving dock are lowered therein for welding and joining. A horizontal rail transport system is employed for transporting the movable platens from one working station to the next and to the graving dock, thereby fabricating ship sections by means of an assembly-line technique. Upon completion of the particular ship section, a crane straddling the graving dock and movable longitudinally therewith is employed to lift the completed section from the rail system and to a position for final assembly in the graving dock. The graving dock uses stepped platforms and movable cross members which are on the same level as the horizontal rail, thus allowing ready movement of the ship section over the graving dock. The section is then lowered into the graving dock by the crane for welding and joining operations as necessary to complete fabrication of the ship. The platens provide a means for attaching cables for lift and lowering, as well as forming a foundation for leveling and jacking the sections into alignment while allowing access to the bottom of the sections to be joined for the welding operation.

Background of the invention

This invention relates to a method and apparatus for shipbuilding, particularly to a method and apparatus for assembling prefabricated ship sections, and more particularly to a method and apparatus for assembling complete ship sections mounted on movable platens in such a manner that the sections can be moved and lowered into a graving dock for final assembly.

In recent years much effort has been directed to developing faster methods for constructing ships, thus reducing the time and related costs of construction. Assembly-line shipbuilding methods have been developed where separate sections of the ship are prefabricated and assembled. Such prior art efforts are exemplified by U.S. Patents 2,368,441 and 3,011,252. However, these prior approaches still have certain drawbacks, namely, the manner in which the sections are fabricated which require a substantial amount of internal bracing to prevent damage due to distortion, stresses or strains while moving or suspending the sections by cranes, as well as the large size cranes required to lift, align, and lower the sections into the graving dock for final assembly.

Summary of the invention

This invention overcomes the drawbacks of the prior art approaches by providing a ship assembly method wherein the ship sections are fabricated on movable platens which additionally form a foundation for leveling and jacking the sections into alignment in the graving dock. The graving dock is of the stepped type having movable cross members operatively mounted on the steps which permits the fabricated ship section to be readily moved into position over the graving dock for direct lift and lowering by a traveling straddle crane, which eliminates excessive moments and couples on the crane which would be necessary if the section could not be located directly over the graving dock. In addition, the movable platens provide a means of attaching cables for lift and lowering of the sections into the graving dock, thus eliminating the distortion, stresses and strains on the sections caused by the prior assembly methods. Also, the movable platens are so constructed as to allow ready access within the graving dock to the entire areas of the ship sections to be welded.

Therefore, it is an object of this invention to provide a method and apparatus for assembling ships.

A further object of the invention is to provide a ship assembly method which utilizes a stepped graving dock and rail transported platens upon which the ship sections are fabricated.

Another object of the invention is to provide a method and apparatus for assembling complete ship sections on movable platens in such a manner that the sections can be moved and lowered into a graving dock for final assembly.

Another object of the invention is to provide a method for the assembly of large ship sections on movable platens, which can be horizontally transported by rail directly over the graving dock, and with hull bracing and shoring provided on the platen which permits more efficient use of the graving dock.

Another object of the invention is to provide a method and apparatus which uses stepped platforms and movable cross members in the graving dock, thus permitting assembled ship sections to be moved into position for direct lift and lowering by a traveling straddle crane.

Another object of the invention is to provide a ship assembly method which includes constructing the ship's sections on movable platens, the platens providing an effective means for attaching cables for lift and lowering thereof into the graving dock and, once lowered into position, forming a foundation for leveling and jacking the sections into alignment for welding to the next section.

Another object of the invention is to provide a ship assembly method which includes constructing the ship's sections on movable platens which are constructed such that when positioned in the graving dock allow ready access to the entire area of the section mounted thereon to be welded to the adjoining section or sections.

Other objects of the invention, not specifically set forth above, will become readily apparent from the following description and accompanying drawings wherein:

Brief description of the drawings

FIG. 1 is a side view of the assembly sections comprising a ship embodiment made in accordance with this invention;

FIG. 2 is a plan view of the inventive graving dock and a portion of the ship assembly section rail arrangement;

FIG. 3 is a side view in greater detail of the FIG. 2 graving dock with portions removed and illustrating the ship sections on movable platens and the crane assembly for same; and FIG. 4 is a partial cross-sectional view of the FIG. 2 graving dock in greater detail and illustrating the stepped platforms and the movable cross members with the straddle crane positioned thereover for lowering a ship section into the dock.

Description of the invention

This invention provides a horizontal rail transport system for assembling major ship sections on movable platens using assembly-line methods, whereby a number of assembly stations are established and as each section assembly operation is completed, the platen is moved on rails to the next assembly station until a finished ship section is complete. The horizontal transport rails are at right angles to a graving dock which has a stepped platform whereby movable cross members can be moved on rails located on the step of the graving dock in such a manner that the platen can be transported on the same horizontal plane, and in alignment with the assembly transport rails, above the longitudinal center line of the graving dock, at the same level as the transport rails. The ship assembly section is shored and blocked by bracing the hull section, directly on the assembly platen. A rail transport straddle crane is positioned over the ship assembly section, and the platen and the ship section are lifted off the platen transport wheels by the hoisting mechanisms on the straddle crane. The cross members and platen wheels are moved to clear the assembled ship section. The assembled ship section and platen are then lowered into the graving dock in correct position for joining and welding to the next assembly ship section. The platens form a foundation for leveling and jacking the sections into final alignment for welding operations, and are constructed such as to allow full access to the areas of the sections to be welded.

Referring now to the drawings, FIG. 1 shows the various assembly sections comprising an embodiment of a ship for purposes of illustration. Sections of the FIG. 1 ship are utilized in FIGS. 2–4 to illustrate the inventive assembly method and the apparatus for carrying out the assembly method.

The graving dock generally indicated at 12 is of the type known in the art except that the sides 13 are each provided with a step 14, as more clearly shown in FIG. 4. The steps 14 are each provided with a rail 15 embedded in the concrete forming the graving dock 12 and upon which a plurality of movable cross members 16 are positioned via cross member dollys 17. Positioned on the upper surface of the dock 12 and parallel with the steps 14 are a pair of rails 18 along which a traveling straddle crane generally indicated at 19 moves via dollies 20. Perpendicular to the crane rails 18 are a plurality of sets of platen rails, each set being indicated generally at 21, serving to transport the assembled sections 1—7, for example, to the graving dock 12 from section assembly stations (not shown but indicated by legend).

The traveling straddle crane 19 includes two pair of upright support members 22, one member of each pair being mounted on dollies 20 on each side of the dock 12. Each pair of support members 22 are interconnected by cross beams 23. Movably mounted on cross beams 23 via dollies 24 are a pair of hoist mechanisms each generally indicated at 25. Each of said hoist mechanisms 25 includes a pair of double drum and cable units 26, each double drum and cable unit being driven by a prime mover 27, such as an electric motor. Each double drum and cable unit utilizes a single cable 28 having a block and hook unit 29 suspended thereby as shown in FIG. 3. The block and hook units 29 are adapted to be attached to cable units 30 hooked to rings 31 on platens generally indicated at 32 for raising and lowering the platens.

The platens 32 function as the support means for the various ship sections 1–11 during assembly, transportation hoisting and, in some instances, leveling in the graving dock. The lower ship sections 1–6 are assembled at the assembly stations on platens 32 and are shored and blocked thereon by bracing members indicated generally at 33 (see FIGS. 3 and 4). The assembled ship sections are then moved on platen dollys 34 along the associated horizontal rail assembly 21 as shown in FIG. 2 to a position adjacent dock 12 such that the ship sections are positioned on the dock in sequence of assembly. The movable cross members 16 are moved along the rails 15 so as to align with the desired rail assembly 21 upon which the section of the ship to be next lowered in the graving dock 12 is mounted. The section of the ship, for example section 2, to be next lowered into dock 12 is moved onto cross members 16 as indicated in FIGS. 3 and 4, and the transport straddle crane 19 is then moved into position over the ship section 2 and the ship section is raised by the mechanism 25 via the cable 30 and rings 31 on the platen 32, such that the platen 32 is raised off the platen dollys 34. The dollys 34 are then rolled off the cross members 16 onto rail assembly 21 for return to the section assembly station for re-use and the movable cross members 16 are moved forward or rearward on the rails 15 such that they clear the ship section 2. The assembled ship section 2 is then lowered into the graving dock by mechanism 25 in a substantially correct position for joining and welding to the next ship section 1 in this illustration. Final positioning of the ship sections within graving dock 12, such as illustrated by ship section 1 in FIG. 3, is accomplished by leveling jacks 35 and blocking timbers 36. When the ship section is lowered into the dock adjacent section 1 and finally positioned by jacks and timbers, the area where the sections are to be welded is readily accessible due to the platens 32 not extending the full length of the ship section, as seen in FIG. 3, such that welding equipment can be moved completely around the portions to be joined.

In the assembly of upper ship sections 7–11, the sections are raised by crane 19 off from the platens 32 by attaching the hoisting mechanism 25 directly to the ship section, by means not shown, after the platen and associated ship section have been moved onto movable cross members 16 as described above. Whereafter, the platen 32 and the associated dollys 34 are returned to the assembly station, the cross members 16 moved, and the ship section, such as section 7 of FIG. 4, is lowered onto the previously assembled section, such as section 5 as shown in FIG. 1.

After the ship has been assembled to the condition that it can be floated, the platens 32 and bracing 33 can be raised intact from the graving dock 12 and returned to the ship assembly station for re-use, thus reducing the cost and increasing the assembly time of ship sections.

It has thus been shown that this invention greatly advances the art of building ships in the following manner:

(1) The assembly of large ship sections on movable platens which can be horizontally transported by rail directly over the graving dock with hull bracing and shoring on the platen, thus permitting more efficient use of the graving dock than the existing method of erecting the ship's hull in the graving dock.

(2) The use of the stepped platforms and movable cross members in the graving dock permits assembled ship sections to be moved into a position for direct lift and lowering by a traveling straddle crane. This eliminates excessive moments and couples on the crane which would be necessary if the assembled ship section could not be located directly over the graving dock.

(3) By constructing the ship sections on movable platens, the platens provide a means for attaching cables for lift and lowering into the graving dock. Also, the platens, once lowered into position in the dock, form a foundation for leveling and jacking ship sections into alignment positions for welding to the next section or sections, while allowing ready access to the adjoining ship section areas to be welded.

While a particular embodiment of the invention has been illustrated and described, modifications will become apparent to those skilled in the art, and it is intended to cover in the appended claims all such modifications as come within the true spirit and scope of the invention.

What I claim is:

1. A method of assembling ships comprising the steps of: placing on a movable platen a horizontal rail transport system, assembling sections of ships on said movable platen which functions as a transporting and foundation forming means for at least certain of the ship sections, moving the moveable platen and ship section mounted thereon via the horizontal rail transport system in a direction perpendicular to and to a position adjacent an associated graving dock within which a ship is to be assembled, aligning movable graving cross members positioned athwart the graving dock with the platen and mounted ship section, moving the platen and ship section onto the movable cross members, moving the cross members holding the platen and ship section to a predetermined position over the graving dock, positioning a dock straddling type crane assembly over the platen and ship section carried on the moved cross members, securing the crane assembly to the platen, lifting the platen and ship section off the movable cross members via the crane assembly, moving the cross members away from the suspended platen and ship section, and lowering the platen and ship section via the crane assembly into the graving dock at substantially the positioned desired for final assembly.

2. The method defined in claim 1, additionally including the steps of leveling the platen so as to position the ship section mounted thereon in final position for securing same to adjacent ship sections.

3. The method defined in claim 2, additionally including the step of securing the ship section to an adjoining ship section.

4. The method defined in claim 1, wherein the step of assembling the ship sections on the movable platens is accomplished by appropriately bracing and shoring the hull portion of the ship section on the platen such that the ship section can be floated off the platen upon completion of the ship assembly.

5. A graving dock for assembling ships including the improvement comprising:
   (a) a stepped platform extending along each side of the graving dock;
   (b) a rail assembly supported on and extending along the length of each of said stepped platforms;
   (c) wheel-like means supported on each of said rail assemblies for movement along said rail assemblies;
   (d) a plurality of movable cross members extending across said dock and supported on said wheel-like means for movement with said wheel-like means along said stepped platforms, said movable cross members each being constructed such that the upper surface thereof is substantially level with the surface adjacent the graving dock;
   (e) a plurality of platens upon which ship sections are assembled, said platens being adapted for transporting the ship sections to the graving dock and for lifting and lowering the ship sections onto said movable cross members and finally into the graving dock, said platens additionally functioning as a foundation for leveling and final positioning of ship sections in the graving dock; and
   (f) a rail system supported on said surface adjacent the graving dock, said rail system extending from the graving dock to ship section assembly stations, said rail system adjacent the graving dock being substantially perpendicular with respect to said stepped platforms and constructed such that said upper surface of each of said movable cross members is substantially level therewith when at least certain of said cross members are aligned with the rail system, said rail system being adapted to transport ship section mounted on aid platen to the graving dock.

6. The graving dock defined in claim 5, wherein the improvement additionally includes a traveling straddle crane positioned to move along said graving dock and adapted to directly lift said platens and ship sections from off said movable cross members and directly lower said platens and ship sections into the graving dock.

References Cited

UNITED STATES PATENTS 591,076 10/1897 Gerdau _____ 61—67 XR
2,337,101 12/1943 Harris _____ 114—65

OTHER REFERENCES

Contruction Method, November 1963, pp. 67–69 and 146.

ANDREW H. FARRELL, *Primary Examiner.*

U.S. Cl. X.R.
61—65; 114—65